United States Patent [19]

Staar

[11] 3,873,993

[45] Mar. 25, 1975

[54] TAPE TRANSPORT WITH FAST FORWARD SPEED

[75] Inventor: Theophiel Clement Jozef Lodewijk Staar, Kraainem, Belgium

[73] Assignee: Staar, S. A., Brussels, Belgium

[22] Filed: Oct. 10, 1973

[21] Appl. No.: 404,990

[30] Foreign Application Priority Data

Jan. 10, 1973 Belgium ........................ 126290

[52] U.S. Cl. ..................... 360/90, 360/105, 360/130

[51] Int. Cl. ......................... G11b 5/54, G11b 15/24

[58] Field of Search ............. 360/90, 105, 109, 130; 242/199-201

[56] References Cited

UNITED STATES PATENTS

| | | | |
|---|---|---|---|
| 2,751,438 | 6/1956 | Baer | 360/90 |
| 3,548,113 | 12/1970 | Althuber | 360/105 |
| 3,664,672 | 5/1972 | Fujikawa et al. | 360/90 |
| 3,680,871 | 8/1972 | Tupaj et al. | 360/105 |
| 3,716,242 | 9/1970 | Maruyama | 360/105 |

*Primary Examiner*—Alfred H. Eddleman

*Attorney, Agent, or Firm*—Wolfe, Hubbard, Leydig, Voit & Osann, Ltd.

[57] ABSTRACT

A transport mechanism for driving a tape from reel to reel at recording-playback speed or fast forward speed is disclosed. A capstan drive is provided for driving the tape at constant recording-playback speed, and a direct drive via the take-up reel is provided for driving the tape at fast forward speed. The transport mechanism also includes an actuator for sequentially shifting the magnetic head used for recording or playback away from the tape before the tape is released from the capstan drive upon selection of fast foward speed, to eliminate sound caused by playback at high speed of the frequencies recorded on the tape.

5 Claims, 3 Drawing Figures

TAPE TRANSPORT WITH FAST FORWARD SPEED

Figures 1, 2, 3:
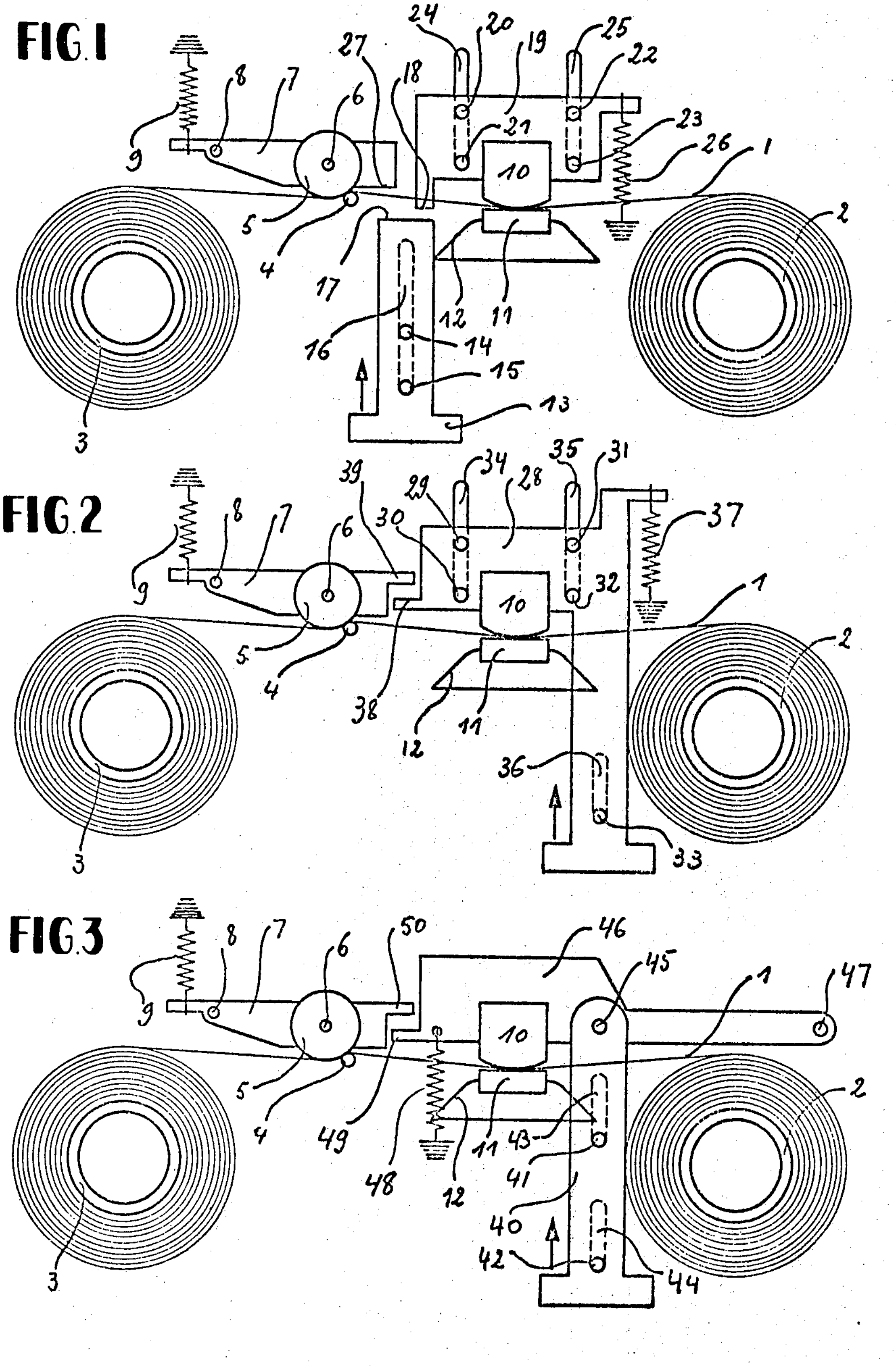

The present invention relates generally to recording and/or playback mechanisms for magnetic tapes wherein the tape is transported from reel to reel past a magnetic head and between a pressure roller and capstan which provide a capstan drive to move the tape at constant speed.

More particularly, the invention relates to the provision of a fast forward drive system which, when the tape is to be driven at fast speed, achieves the necessary withdrawal of the tape from the magnetic head or vice versa and releases it from the pressure of the pressure roller. In mechanisms of this kind, the take-up reel, having during normal operation to rotate at a speed which varies constantly as the tape is accumulating thereon, is rotated by a direct drive from the motor through a slipping friction device which slips to absorb the varying differential between playback-recording tape speed as produced by the capstan drive and a higher nominal speed at which the take-up reel is driven via the direct drive, as shown for example, in Staar U.S. Pat. No. 3,385,534.

Consequently, if the motor of the mechanism is operating, the tape, as soon as released from contact against the magnetic head and from the pressure roller pressing it against the capstan, will be driven at a speed corresponding to the nominal rotational speed of the take-up reel via the direct drive, the friction slipping device having no tape braking to absorb. In many simple tape transport mechanisms, the fast drive of the tape is achieved in that way. In these existing mechanisms, the recording-playback head on the one hand, and the pressure roller or its support on the other hand, are typically mounted on a common movable element. Resilient means tend to hold this element in operative position, out of which it can be temporarily shifted by a manual actuator. In practice, such devices show, nevertheless, major drawbacks: when actuating the manual actuator to move the magnetic head and the pressure roller from the tape, there comes a time where the playback head still remains in contact with the tape and when the pressure roller no longer presses the tape against the capstan, the tape being then driven at high speed by the direct drive to the take-up reel. There results a very unpleasant whistling sound caused by playback at high speed of the frequencies recorded on the tape; in addition, the pressure roller or its support and the recording-playback head being mounted on a common element, that element has to be submitted to the action of resilient means which, to maintain the element in operative position, are required to be strong enough to hold the pressure roller against the capstan, as well as withstand the pressure of the pads holding the tape against the heads. Thus, to manually actuate said common element, enough force has to be exerted to overcome the strong resilient means during the largest part of the stroke of the element.

The main object of this invention is to overcome these drawbacks by insuring that fast speed transport of the tape takes place only after complete withdrawal of the playback head from the tape.

Another object is to provide a mechanism which requires less manual force to operate by arranging the pressure roller and magnetic head on separate elements, such that the manual actuator needs to overcome the additional resilient force acting on the pressure roller during only a minor part of its stroke.

Other objects will appear from the following description taken in connection with the accompanying drawings wherein:

FIG. 1 schematically illustrates a first embodiment of the invention;

FIG. 2 schematically illustrates a second embodiment of the invention; and

FIG. 3 schematically illustrates a third embodiment of the invention.

Referring to the drawings, in all three embodiments of the invention there illustrated, the magnetic head and the pressure roller of the tape transport are mounted on separate elements, one being movable against the other, these elements being arranged in such a way that an actuator causes, during the first part of its stroke, withdrawal from the tape of the head, and during the second part of its stroke, the additional withdrawal from the tape of the pressure roller.

Thus in all three figures 1–3, there is a magnetic tape 1 which unwinds from a take-off reel 2 and winds on a take-up reel 3, and a capstan drive for driving the tape 1 at a constant speed including the capstan 4 against which the tape 1 is pressed by a pressure roller 5. The pressure roller 5 is fixed to a spindle 6 which is carried by an arm 7, the arm 7 being one of the previously referred separate elements. The arm 7 is pivotally mounted on a spindle 8 and is acted on by a spring 9 tending to cause the pressure roller 5 to press the tape 1 against the capstan 4.

In each illustration of the various embodiments of the invention, a magnetic playback-recording head 10 is incorporated, against which the tape is pressed by a pressure pad 11, under the action of a leaf spring 12. In FIG. 1, the head 10 is carried by a movable support 19, which is the other one of the previous referred to separate elements. In FIG. 1 there is also provided a fast forward actuator 13, which is longitudinally slidable under the constraint provided by two pins 14 and 15 carried by the actuator 13 and adapted to slide in a slot 16 in the frame. The head support 19 is similarly mounted with the fixed pins 20, 21, 22 and 23 allowing it to slide longitudinally in slots 24 and 25 in the main frame.

As manual force is exerted on the actuator 13 in the direction shown by the arrow, the actuator will first meet at its end 17 the end 18 of the head support 19, and move the head 10 away from the tape 1 against the action of the spring 26. After the actuator 13 has finished the initial portion of its stroke and withdrawn the head support 19 and head 10 from the tape, the actuator meets, still through its end 17, the end 27 of the arm 7 bearing the pressure roller 5 and drives the latter also away from the tape 1, against the action of the spring 9.

Now referring to FIG. 2, there is shown another embodiment of the invention, operating similarly to the embodiment of FIG. 1, except that the fast forward actuator itself carries the magnetic head, and thus the actuator and head support are formed as a common element 28. Said element 28 bears pins 29, 30, 31, 32 and 33 adapted to slide in slots 34, 35 and 36 in the main frame. Said element 28 is acted on by a spring 37 tending to urge the head 10 into operative position against the tape 1. When manual force is exerted on the actuator element 28 in the direction shown by the arrow, it slides, moves the head 10 away from the tape 1, meets through its end 38 the end 39 of the arm 7, and then moves the pressure roller 5 away from the tape 1. As in the form of the invention shown in FIG. 1, there is sequential shifting movement of the magnetic head and pressure roller, such that the head is shifted away from the tape before the tape is released from the capstan drive.

Now referring to FIG. 3, there is illustrated a third embodiment of the invention. In this case, the actuator 40 which is longitudinally slidable having two pins 41 and 42 which slide in slots 43 and 44, is linked through a pivot 45 to an arm 46 bearing the head 10 and adapted to swivel around a spindle 47. A spring 48 acts on the arm 46 tending to urge the head 10 into operative position against the tape 1. When manual force is exerted on the actuator 40 in the direction shown by the arrow, the arm 46 swivels around the spindle 47, the head 10 moves away from the tape 1 and, thereafter, the end 49 of the arm 46 meets the end 50 of the arm bearing the pressure roller and moves the roller away from the tape 1.

It can be seen that, in all three of the embodiments described hereinabove, there is sequential movement of the head 10 away from the tape before the tape is released from the capstan drive, and the direct drive through the take-up reel causes the tape to move at fast speed. Furthermore, during a major portion of its stroke, the actuator (13, 28 or 40) for moving the head and the pressure roller away from the tape has only to overcome the action of the resilient means (26, 37 or 48) maintaining the head in operative position against the tape, while having only for a minor portion at the end of its stroke to also overcome the strength of the spring 9 acting on the pressure roller 7. Thus less force will be required to manually actuate the mechanism during the initial portion of the stroke of the actuator.

I claim as my invention:

1. In a transport mechanism for driving a tape from reel to reel selectively at recording-playback speed or fast speed, said transport mechanism having a capstan drive for driving the tape at recording-playback speed and a take-up drive means for one of the reels to drive the tape at a fast speed, said take-up drive means including a friction device which slips when said capstan drive is engaged to absorb the varying differential between recording-playback speed and the higher speed at which said one reel is driven via said take-up drive means, the combination comprising:

a capstan drive for the tape including a capstan and a shiftable pressure roller movable into and out of engagement with said capstan, a movable lever carrying said pressure roller for shifting movement, said lever being displaceable from a first position in which said capstan drive is engaged with said pressure roller pressing the tape against said capstan, to a second position in which said tape is released from said capstan drive and said pressure roller is located away from the tape, a magnetic head for recording or playback of sound recording on the tape, a support for said head movably carried for movement independently of said lever, said support being displaceable from a first position in which said head is engaged with the tape, to a second position in which said head is located away from the tape, and actuator means for sequentially shifting said support and said lever from their first to their second positions to move the head away from the tape before releasing the tape from said capstan drive for transport at fast speed from reel to reel by said take-up drive means.

2. In a transport mechanism, the combination according to claim 1 in which resilient means are connected to both said lever and said support tending to urge said pressure roller and head into tape engagement, and said actuator is movable by manual force, the sequential shifting of said lever and said support requiring less force to move said actuator means during the initial support shifting portion of its stroke.

3. In a transport mechanism, the combination according to claim 1 in which said actuator means and said support comprise a common element, and said element is engageable to move said lever after an initial support shifting stroke portion.

4. In a transport mechanism, the combination according to claim 1 in which said lever is pivotally mounted, and resilient means are connected to said lever tending to urge said pressure roller into tape engagement.

5. In a transport mechanism, the combination according to claim 1 in which said support is engageable with said lever in response to movement by said actuator means to achieve sequential shifting thereof.

* * * * *